Patented Mar. 3, 1925.

1,528,218

UNITED STATES PATENT OFFICE.

JAMES M. LEAVER AND ELIE S. HUMBOLDT, OF OAKLAND, CALIFORNIA, ASSIGNORS TO THE PACIFIC LUMBER COMPANY, OF SAN FRANCISCO, CALIFORNIA, A CORPORATION OF MAINE.

PROCESS OF MANUFACTURING PURE CELLULOSE FROM WOOD.

No Drawing.     Application filed November 26, 1923.   Serial No. 677,177.

*To all whom it may concern:*

Be it known that we, JAMES M. LEAVER and ELIE S. HUMBOLDT, both citizens of the United States, residing at Oakland, in the county of Alameda and State of California, have invented certain new and useful Improvements in a Process of Manufacturing Pure Cellulose from Wood, of which the following is a specification.

Our invention relates to a process for making pure cellulose through reduction with dilute nitric acid of the various lignocelluloses, and particularly of the by-products of the redwood lumber industries, such as shavings, saw dust and all kinds of mill waste.

The redwood tree, *Sequoia sempervirens*, yields a specially high grade cellulose well adapted to the manufacture of artificial silk by any of the standard processes, and we will now describe our invention as adapted to that particular wood, but we do not wish to confine ourselves to redwood especially, as all other highly lignified materials can advantageously be treated in the same way.

The first step in our process consists in leaching the suitably comminuted wood to extract all of the soluble matter with hot water by any of the well known methods. The extractive matter can be saved if desired as it finds uses in the arts.

The leached material is then placed in an acid resistant vessel and covered with a perforated plate of suitable weight, then dilute nitric acid of about 7 to 10% is added to cover the whole. The vessel, which should be connected to a suitable condensing system, is then covered and gently heated to about 86 to 90 C., upon which the reaction starts very quickly.

The purpose of the perforated plate is to keep the material under treatment completely immersed in the acid, and to allow the escape of the vapors. An agitator can be used if desired but too much agitation is not recommended as it produces a very fine, pulpy mass difficult to handle later on.

When the reaction has proceeded to the point where the mass is of a reddish color, the whole is taken out and drained, preferably under the influence of suction or pressure, washed once more and given a boiling for a few minutes in a dilute solution of caustic soda or of carbonate, pressed out, washed and given a second treatment in dilute nitric acid until the pulp has taken on a pale yellow color.

The purpose of the intermediate treatment with an alkali is to eliminate a large amount of coloring matter which would otherwise have to be destroyed by the nitric acid, thus entailing a waste of time and of reagent.

The pulp resulting from the second treatment is drained, washed and then given a lightbleach with lime preferably, washed thoroughly and pressed, then dried.

It is advantageous to return the liquid residue from the second acid treatment to the first stage, while as much of the residue from the first as can be handled can be run over the condensing system. The balance can be neutralized to recover the oxalic acid and the nitric residue as well, although any such treatment of the waste residue has no direct bearing on our invention except in a lowering of the cost.

The cellulose obtained in this way is practically pure, and being a cellulose of such high purity it will nitrate well and produce a good grade of collodion. It is especially adapted for the manufacture of viscose, and is an entirely different product from that obtained by either the soda or the bisulfite process.

By using a good condensing system composed of tourils and absorbtion towers it is possible to recover a good percentage of the nitric used, while the recovery of the oxalic acid helps to keep down the cost of production.

We claim:

1. The process of making cellulose from the sequoia and other highly impregnated woods which consists in leaching out the extractive matter, treating with dilute nitric acid, washing out the soluble matter, retreating with dilute nitric acid and washing.

2. The process of making cellulose from the sequoia or other highly impregnated woods which consists in leaching out the extractive matter, treating with dilute nitric acid, washing out the soluble matter, retreating with dilute nitric acid, washing, and drying.

3. The process of making cellulose from the sequoia or other highly impregnated woods which consists in leaching out the extractive matter, treating with dilute nitric acid, washing out the soluble matter, re-treating with dilute nitric acid, washing, bleaching, and drying.

4. The process of making cellulose from the sequoia or other highly impregnated woods which consists in leaching the wood in hot water, treating with dilute acid and washing, the acid treatment being interrupted with an intermediate treatment with an alkali at a boiling temperature.

5. The process of making cellulose from the sequoia or other highly impregnated woods which consists in leaching the wood in hot water, treating with dilute nitric acid and washing, the acid treatment being interrupted with an intermediate treament with an alkali at a boiling temperature.

6. The process of making cellulose from wood which consists in treating the wood with dilute nitric acid, heating, draining and treating with an alkali, washing, re-treating with dilute nitric acid, draining, washing, pressing and drying.

7. The process of making cellulose from wood which consists in treating the wood with dilute nitric acid and the application of heat, draining, and boiling in a dilute alkaline solution, washing, re-treating with dilute nitric acid, washing, pressing and drying.

JAMES M. LEAVER.
ELIE S. HUMBOLDT